(12) United States Patent  
Cho et al.

(10) Patent No.: US 8,884,746 B1  
(45) Date of Patent: Nov. 11, 2014

(54) APPARATUS FOR GENERATING TACTILE SENSATION BY USING MAGNETIC FIELD

(71) Applicant: Center of Human-Centered Interaction for Coexistence, Seoul (KR)

(72) Inventors: Jai Hi Cho, Seoul (KR); Joung Huem Kwon, Seoul (KR); Shin Young Kim, Seoul (KR); Bum Jae You, Seoul (KR)

(73) Assignee: Center Of Human-Centered Interaction For Coexistence, Seoul (KR)

( * ) Notice: Subject to any disclaimer, the term of this patent is extended or adjusted under 35 U.S.C. 154(b) by 0 days.

(21) Appl. No.: 14/252,922

(22) Filed: Apr. 15, 2014

(30) Foreign Application Priority Data

Jun. 21, 2013 (KR) .......................... 10-2013-0071464

(51) Int. Cl.
*H04B 3/36* (2006.01)
*G08B 6/00* (2006.01)
*G06F 3/01* (2006.01)

(52) U.S. Cl.
CPC .. *G08B 6/00* (2013.01); *G06F 3/014* (2013.01)
USPC ...... 340/407.1; 340/412; 340/965; 310/12.24

(58) Field of Classification Search
CPC ................................ G06F 3/014; G06F 3/016
USPC ........................................................ 340/407.1
See application file for complete search history.

(56) References Cited

U.S. PATENT DOCUMENTS

| 2004/0019447 A1* | 1/2004 | Shachar ........................ 702/115 |
| 2009/0009481 A1* | 1/2009 | Yatsu et al. ................... 345/173 |
| 2013/0214913 A1* | 8/2013 | Efrati .......................... 340/407.1 |

* cited by examiner

*Primary Examiner* — Daniel Wu
*Assistant Examiner* — Frederick Ott
(74) *Attorney, Agent, or Firm* — Husch Blackwell LLP

(57) ABSTRACT

An apparatus for generating tactile sensation by using a magnetic field, includes: a first magnet and a second one which are placed across a target as a subject to provide tactile sensation; and a first electromagnet placed between the target and the first magnet; wherein a strength of the whole magnetic field between the first and the second magnets is allowed to be adjusted by adjusting at least either of a direction and a strength of a magnetic field arising from the first electromagnet to control the strength of the force with which the target is pressed by the first and the second magnets. Because a magnet itself that generates a magnetic field without any complicated mechanical components may perform a function as an actuator that generates tactile sensation, the apparatus for generating tactile sensation may become simple, light and compact.

8 Claims, 6 Drawing Sheets

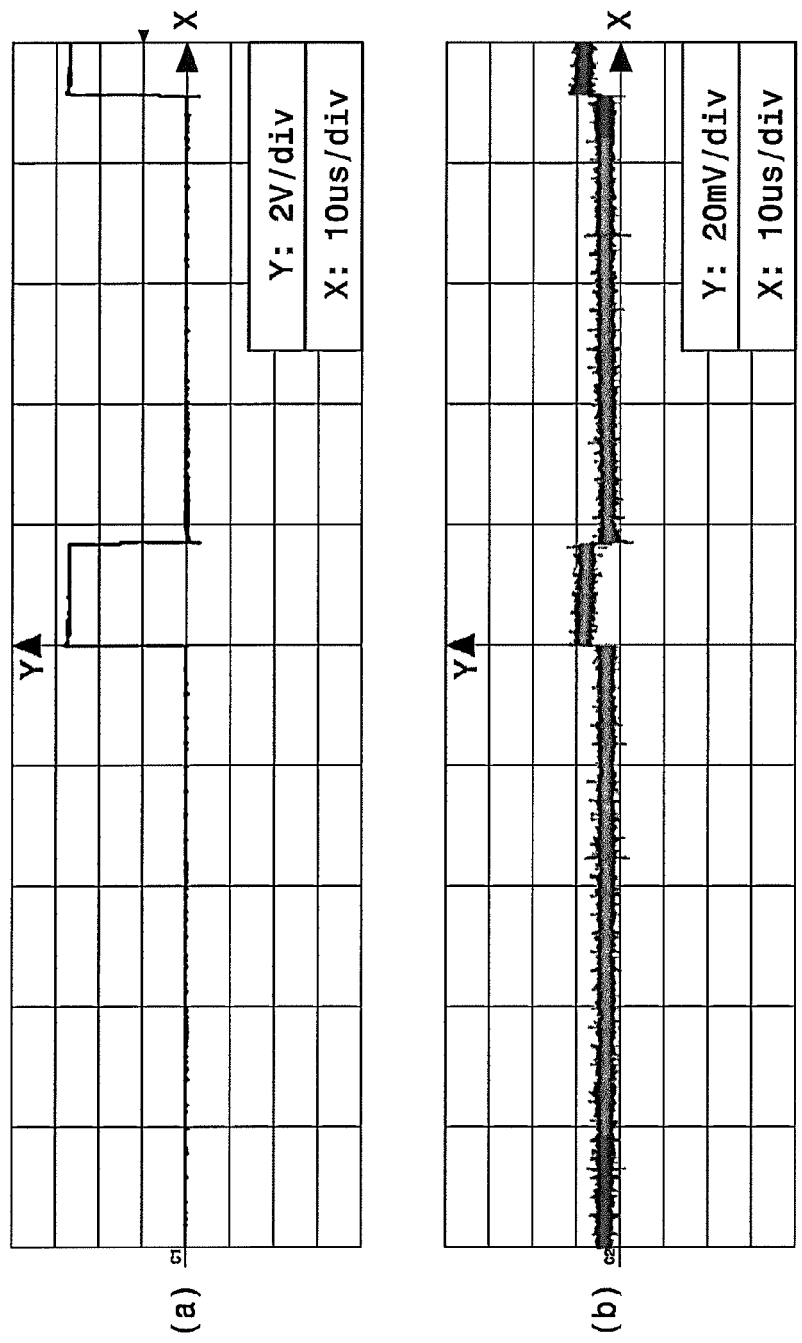

US 8,884,746 B1

APPARATUS FOR GENERATING TACTILE SENSATION BY USING MAGNETIC FIELD

CROSS REFERENCE TO RELATED APPLICATION

This application claims priority to and incorporates herein by reference all disclosure in Korean Patent Application No. 10-2013-0071464 filed Jun. 21, 2013.

FIELD OF THE INVENTION

The present invention relates to an apparatus for generating tactile sensation by using a magnetic field; and more particularly, to the apparatus, which includes a first magnet and a second one symmetric to each other across a target, e.g., a finger, as a subject to provide tactile sensation and further an electromagnet between the target and the first magnet and/or between the target and the second one, for controlling strength of force with which the target is pressed by the first magnet and the second one, vibration delivered to the target, change of location where the target is pressed, etc. by adjusting at least one of direction, strength, applying time, and applying cycle of the magnetic field arising from the electromagnet to adjust magnetic field strength between the first and the second magnets or by moving the first or the second magnet on the electromagnet.

BACKGROUND OF THE INVENTION

Recently, the development of technologies for generating tactile sensation delivered to users has been actively made in a variety of fields such as video conferences, remote control of a robot, virtual reality, smart phones, and games.

As conventional apparatuses for generating tactile sensation, VibeTonz by Immersion Corporation, Phantom-DRAWN by NTT, etc. have been introduced. An actuator used by VibeTonz, composed of an eccentric rotor and a motor, causes vibration by rotation of the eccentric rotor and Phantom-DRAWN generates a specific directional virtual force vector by using movement of a mass with asymmetric acceleration.

However, VibeTonz has a difficulty to generate a variety of patterns of vibration because the vibration of the VibeTonz does not have any directional nature. Further, Phantom-DRAWN has a difficulty to generate high-quality tactile sensation because it may cause the force of an unintended direction. In addition, conventional tactile sensation-generating apparatuses as shown above had difficulties in being light or compact because they must essentially include components such as a motor, a drive shaft, and an eccentric rotor, which have large volumes and higher mass, to generate tactile sensation, i.e., vibration or force.

For the reasons, the inventor came to reach the development of the apparatus for generating tactile sensation that allows a magnet itself to perform a function of an actuator of generating tactile sensation.

SUMMARY OF THE INVENTION

It is an object of the present invention to solve all the problems mentioned above.

It is further an object of the present invention to provide an apparatus, which includes a first magnet and a second one symmetric to each other across a target as a subject to provide tactile sensation and further an electromagnet between the target and the first magnet and/or between the target and the second one, for controlling strength of force with which the target is pressed by the first magnet and the second one, vibration delivered to the target, change of location where the target is pressed, etc. by adjusting at least one of direction, strength, applying time, and applying cycle of the magnetic field arising from the electromagnet to adjust magnetic field strength between the first and the second magnets or by moving the first or the second magnet on the electromagnet.

In accordance with one aspect of the present invention, there is provided an apparatus for generating tactile sensation by using a magnetic field, including: a first magnet and a second one which are placed across a target as a subject to provide tactile sensation; and a first electromagnet placed between the target and the first magnet; wherein a strength of the whole magnetic field between the first and the second magnets is allowed to be adjusted by adjusting at least either of a direction and a strength of a magnetic field arising from the first electromagnet to control the strength of the force with which the target is pressed by the first and the second magnets.

In accordance with another aspect of the present invention, there is provided an apparatus for generating tactile sensation by using a magnetic field, including: a first magnet and a second one which are placed across a target as a subject to provide tactile sensation; and a first electromagnet placed between the target and the first magnet; wherein a strength of a magnetic field between the first and the second magnets is allowed to be changed by adjusting at least either of applying time and applying cycle of the magnetic field arising from the first electromagnet to control vibration, caused by the first and the second magnets, delivered to the target.

In accordance with still another aspect of the present invention, there is provided an apparatus for generating tactile sensation by using a magnetic field, including: a first magnet and a second one which are placed across a target as a subject to provide tactile sensation; a first electromagnet placed between the target and the first magnet; and a second electromagnet placed between the target and the second magnet; wherein a strength of a magnetic field between the first and the second magnets is allowed to be adjusted by adjusting at least either of a direction and a strength of a magnetic field arising from the first electromagnet to control the strength of the force with which the target is pressed by the first and the second magnets; and wherein the strength of the magnetic field between the first and the second magnets is allowed to be changed by changing at least either of applying time and applying cycle of the magnetic field arising from the second electromagnet to control vibration, caused by the first and the second magnets, delivered to the target.

In accordance with still another aspect of the present invention, there is provided an apparatus for generating tactile sensation by using a magnetic field, including: a first magnet and a second one which are placed across a target as a subject to provide tactile sensation; and at least two first electromagnets placed between the target and the first magnet, at even distance between each one with a preset angle; wherein the first magnet is moved on the first electromagnets by adjusting at least one of a strength, a direction, applying time, and applying cycle of a magnetic field arising from at least one electromagnet among the first electromagnets to control the change of the location where the target is pressed by the first and the second magnets.

BRIEF DESCRIPTION OF THE DRAWINGS

The above and other objects and features of the present invention will become apparent from the following description of preferred embodiments given in conjunction with the accompanying drawings, in which:

FIG. 6 is a diagram showing an experimental result acquired by using the apparatus for generating tactile sensation in accordance with the present invention.

DETAILED DESCRIPTION OF THE PREFERRED EMBODIMENTS

Figure 1:
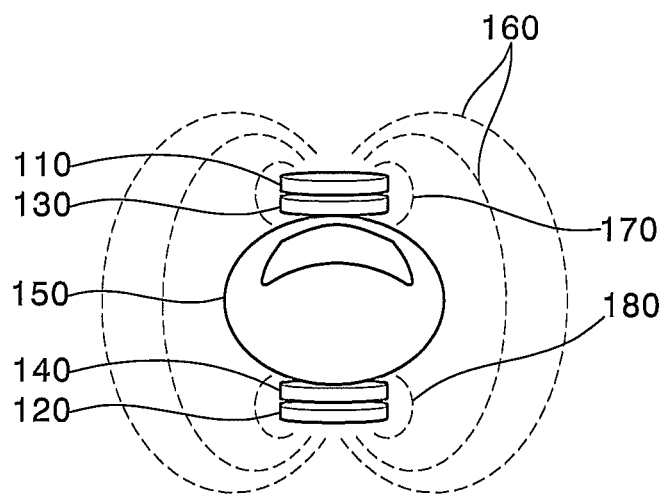
FIG. 1 is a drawing exemplarily illustrating a configuration of an apparatus for generating tactile sensation in accordance with a first example embodiment of the present invention.

The detailed description of the present invention illustrates specific embodiments in which the present invention can be performed with reference to the attached drawings.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the location or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To allow those skilled in the art to the present invention to be carried out easily, the example embodiments of the present invention by referring to attached diagrams will be explained in detail as follows:

Configuration of Apparatus for Generating Tactile Sensation

An internal configuration of an apparatus for generating tactile sensation that performs important functions and the functions of each component of the apparatus to implement the present invention are explained below.

FIG. 1 exemplarily shows the configuration of the apparatus for generating tactile sensation in accordance with a first example embodiment of the present invention. For reference, FIG. 1 is a drawing that shows the side view of the apparatus for generating tactile sensation 100 placed to a target 150.

As illustrated in FIG. 1, the apparatus for generating tactile sensation 100 in accordance with the first example embodiment of the present invention may include a first magnet 110, a second magnet 120, a first electromagnet 130, and a second electromagnet 140, wherein the first magnet 110 and the second magnet 120 could be implemented as permanent magnets, but they would not be limited thereto. Herein, one of the first electromagnet 130 and the second electromagnet 140 can be omitted.

First of all, the first magnet 110 and the second magnet 120 in accordance with the first example embodiment of the present invention may be symmetrically placed, across an object, i.e., a target, e.g., a finger or a back of a hand of a user, as a subject to provide tactile sensation. As such, a magnetic field 160 may be formed to a direction of pulling the first magnet 110 and the second magnet 120 which are placed across the target 150. Accordingly, the first magnet 110 and the second magnet 120 may press the target 150 while pulling each other by the magnetic field 160 and at the time, the first magnet 110 and the second magnet 120 may allow the user to feel force by which the target 150 is pressed as a sense of pressure.

In accordance with one example embodiment of the present invention, the first electromagnet 130 may be placed between the target 150 and the first magnet 110, and a strength or a direction of a magnetic field 170 arising from the first electromagnet 130 may be adjusted by a certain control means (not illustrated) and be configured in a form of coil.

More specifically, if the first electromagnet 130 pulls the first magnet 110 as the direction of the magnetic field 170 arising from the first electromagnet 130 corresponds to that of the magnetic field 160 between the first magnet 110 and the second magnet 120, the strength of a whole magnetic field between the first magnet 110 and the second magnet 120 may become large enough to cause force by which the first magnet 110 and the second magnet 120 press the target 150 to be larger and accordingly increase even the sense of pressure felt by the user. At the time, as the strength of the magnetic field 170 arising from the first electromagnet 130 becomes larger, the sense of pressure felt by the user may become higher.

On the contrary to this, if the first electromagnet 130 pushes the first magnet 110 as the direction of the magnetic field 170 arising from the first electromagnet 130 is opposite to that of the magnetic field 160 between the first magnet 110 and the second magnet 120, the strength of the whole magnetic field between the first magnet 110 and the second magnet 120 becomes small enough to cause the force by which the first magnet 110 and the second magnet 120 press the target 150 to become smaller and accordingly, may reduce even sense of pressure felt by the user. At the time, as the strength of the magnetic field 170 arising from the first electromagnet 130 becomes larger, the sense of pressure felt by the user may become smaller.

Next, the second electromagnet 140 in accordance with the first example embodiment of the present invention may be placed between the target 150 and the second magnet 120 and an applying time or applying cycle of a magnetic field 180 arising from the second electromagnet 140 may be adjusted by the certain control means (not illustrated).

More specifically, if the second electromagnet 140 pulls the second magnet 120 periodically as the direction of the magnetic field 180 arising from the second electromagnet 140 corresponds to that of the magnetic field 160 between the first magnet 110 and the second magnet 120 at a predetermined time interval periodically, the strength of the whole magnetic field between the first magnet 110 and the second magnet 120 repeatedly becomes larger and then returns to the original to allow a force by which the first magnet 110 and the second magnet 120 press the target 150 to become larger and return to the original periodically and repeatedly. Accordingly, the user may feel a sense of vibration. Contrarily, if the second electromagnet 140 pushes the second magnet 120 periodically as the direction of the magnetic field 180 arising from the second electromagnet 140 is opposite to that of the magnetic field 160 between the first magnet 110 and the second magnet 120 at a predetermined time interval periodically, the strength of the whole magnetic field between the first magnet 110 and the second magnet 120 repeatedly becomes smaller and then returns to the original to allow a force by which the first magnet 110 and the second magnet 120 press the target 150 to become smaller and return to the original periodically and repeatedly. Accordingly, the user may feel a sense of vibration.

For reference, it is explained as an example that the sense of vibration is felt by allowing the magnetic field 180 arising from the second electromagnet 140 to be generated periodically at the predetermined time interval, but it is not limited only to this. For example, only the first electromagnet 130 can be allowed to be controlled as such. For another example, all the first electromagnet 130 and the second electromagnet 140 can be controlled as such.

In accordance with the first example embodiment of the present invention, even while strength, direction, applying time, and applying cycle of the magnetic fields 170 and 180 arising from the first electromagnet 130 or the second electromagnet 140 are changed, the magnetic field 160 arising from the first magnet 110 and the second magnet 120 may be set relatively more largely than the magnetic fields 170 and 180 arising from the first electromagnet 130 or the second electromagnet 140 in order to keep the state of the first magnet 110 and the second magnet 120 being pulled with each other across the target 150 (i.e., in order to prevent the first magnet 110 and the second magnet 120 from being detached from the target 150).

In accordance with the aforementioned example embodiments, it is explained only for the case that the apparatus 100 for generating tactile sensation includes all the first electromagnet 130 and the second electromagnet 140, but the apparatus 100 for generating tactile sensation in accordance with the present invention is not limited thereto. For example, in accordance with another example embodiment of the present invention, the apparatus 100 for generating tactile sensation may include only either of the first electromagnet 130 and the second electromagnet 140.

Figure 2:
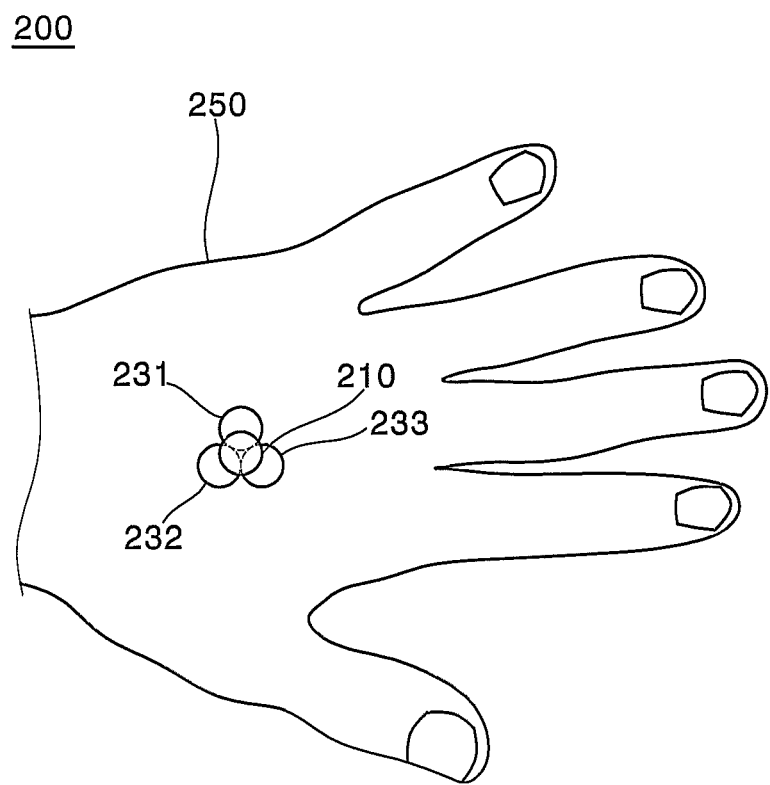
FIGS. 2 through 4 are drawings exemplarily illustrating a configuration of the apparatus for generating tactile sensation in accordance with a second example embodiment of the present invention.
Figure 3:
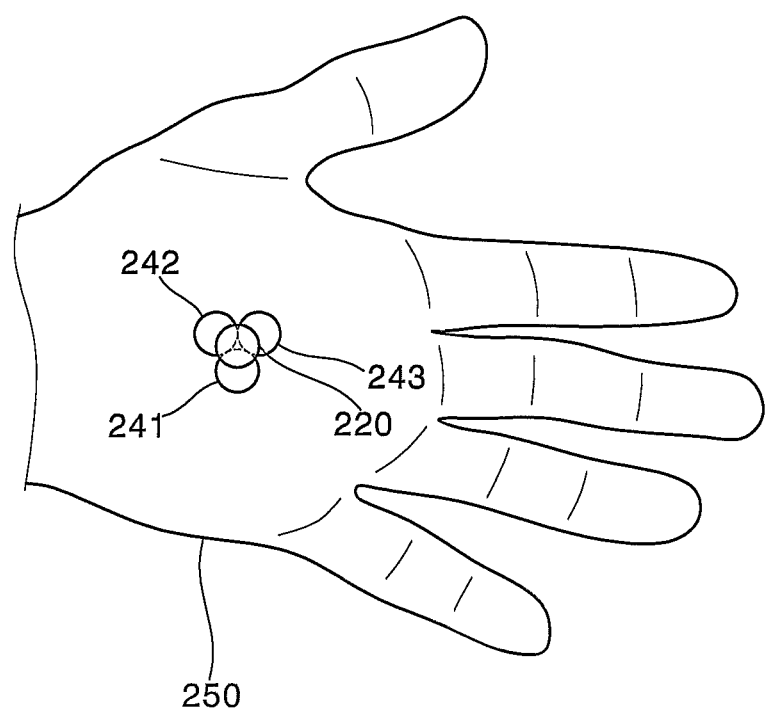
Figure 4:
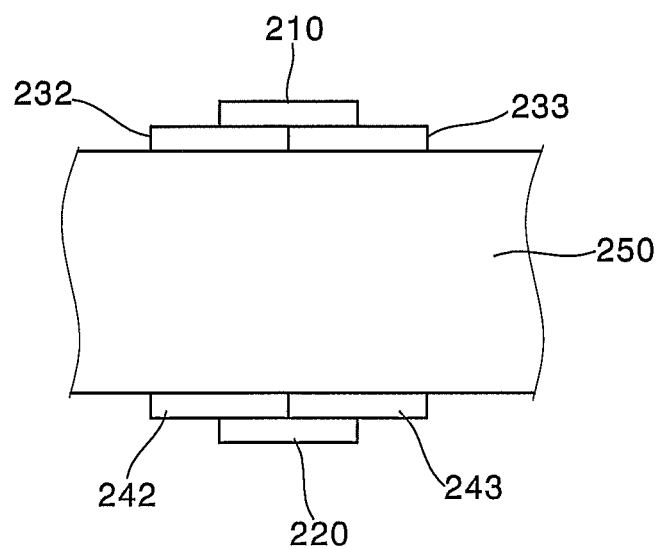

FIGS. 2 through 4 are drawings exemplarily showing the configuration of the apparatus for generating tactile sensation in accordance with the second example embodiment of the present invention. For reference, FIGS. 2, 3, and 4 are drawings that show the views of the apparatus for generating tactile sensation 200 placed to a target 250.

As illustrated in FIGS. 2 through 4, the apparatus 200 for generating tactile sensation in accordance with the second example embodiment of the present invention may be configured by including a first magnet 210, a second magnet 220, at least two first electromagnets (in FIGS. 2 through 4, three first electromagnets 231, 232, and 233 are assumed) and at least two second electromagnets (in FIGS. 2 through 4, three first electromagnets 241, 242, and 243 are assumed). For convenience, the drawings cite three electromagnets as examples, but two electromagnets would be applicable.

In accordance with the second example embodiment of the present invention, the first magnet 210 and the second magnet 220 may be symmetrically placed across an object, i.e., a target 250, e.g., a finger or a back of a hand of a user, as a subject to provide tactile sensation and accordingly a magnetic field between the first magnet 210 and the second magnet 220 may be formed in a direction to which they are pulled with each other. Accordingly, while pulling each other by the magnetic field, the first magnet 210 and the second magnet 220 may press the target 250. At this time, the force by which the first magnet 210 and the second magnet 220 press the target 250 may be felt as sense of pressure by the user.

Next, at least two first electromagnets (in FIG. 1, three first electromagnets 231, 232, and 233 are assumed) in accordance with the second example embodiment of the present invention may be placed between target 250 and the first magnet 210, at even distance between each one with a preset angle, and a strength or a direction of the magnetic field arising from the first electromagnets 231, 232, and 233 may be adjusted by a certain control means (not illustrated).

More preferably, by referring to FIGS. 2 through 4, the first electromagnets 230 may include electromagnet A 231, electromagnet B 232, and electromagnet C 233 that are placed in a form of regular triangle and the second electromagnets 240 may include electromagnets D 241, E 242, and F 243 that are placed also in a form of regular triangle. The electromagnets A 231 and D 241, the electromagnets B 232 and E 242, and the electromagnets C 233 and F 243 across the target 250 may be symmetrically placed and thus a strength and a direction of magnetic fields arising from the electromagnets A 231, B 232, C 233, D 241, E 242, and F 243, respectively, may be assumed to be independently adjusted by the certain control means (not illustrated).

Figure 5:
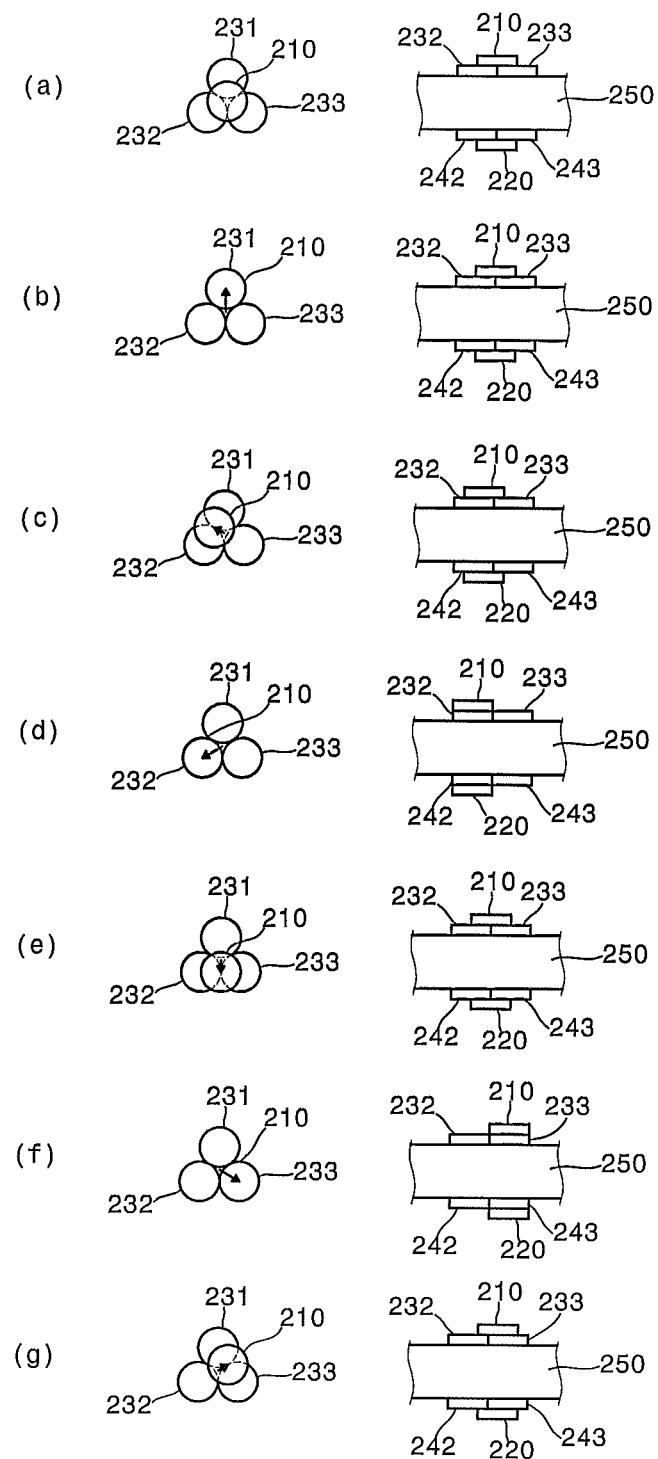
FIG. 5 is a diagram showing an example of operation of the apparatus for generating tactile sensation in accordance with the second example embodiment of the present invention.

FIG. 5 is a drawing illustrating an example of the operation of the apparatus 200 for generating tactile sensation in accordance with the second example embodiment of the present invention.

Only interactions between the first electromagnets 231, 232, 233 and the first magnet 210 will be explained, but because such explanation is identically applied even to those between the second electromagnets 241, 242, 243 and the second magnet 220, detailed explanation will be omitted.

First, if there is no magnetic field arising from the electromagnets A 231, B 232, and C 233 or if there is a magnetic field with the same strength and the same direction is made from each of the electromagnets A 231, B 232, and C 233, the first magnet 210 may be located in a center (referred to as a "central part") among the electromagnets A 231, B 232, and C 233 (by referring to (a) in FIG. 5).

Next, if a magnetic field in the same direction as that between the first magnet 210 and the second magnet 220 arises from the electromagnet A 231 only, as the electromagnet A 231 pulls the first magnet 210, the first magnet 210 that was located in the central part moves to a part where the electromagnet A 231 is located and the user, accordingly, may feel the sense of direction from the central part to the part where the electromagnet A 231 is located (by referring to (b) in FIG. 5).

Besides, if a magnetic field in the same direction as that between the first magnet 210 and the second magnet 220 arises from each of the electromagnets A 231 and B 232 only, as the electromagnets A 231 and B 232 pull the first magnet 210, the first magnet 210 that was located in the central part moves to a middle part between the electromagnets A 231 and B 232 and the user, accordingly, may feel the sense of direction from the central part to the middle part therebetween (by referring to (c) in FIG. 5).

In addition, if a magnetic field in the same direction as that between the first magnet 210 and the second magnet 220 arises from the electromagnet A 232 only, as the electromagnet A 232 pulls the first magnet 210, the first magnet 210 that was located in the central part moves to a part where the electromagnet A 232 is located and the user, accordingly, may feel the sense of direction from the central part to the part where the electromagnet A 232 is located (by referring to (d) in FIG. 5).

If a magnetic field in the same direction as that between the first magnet 210 and the second magnet 220 arises from each of the electromagnets B 232 and C 233 only, as the electromagnets B 232 and C 233 pull the first magnet 210, the first magnet 210 that was located in the central part moves to a middle part between the electromagnets B 232 and C 233 and the user, accordingly, may feel the sense of direction from the central part to the middle part therebetween (by referring to (e) in FIG. 5).

Additionally, if a magnetic field in the same direction as that between the first magnet 210 and the second magnet 220 arises from the electromagnet C 233 only, as the electromagnet C 233 pulls the first magnet 210, the first magnet 210 that was located in the central part moves to a part where the electromagnet C 233 is located and the user, accordingly, may feel the sense of direction from the central part to the part where the electromagnet C 233 is located (by referring to (f) in FIG. 5).

If a magnetic field in the same direction as that between the first magnet 210 and the second magnet 220 arises from each of the electromagnets A 231 and C 233 only, as the electromagnets A 231 and C 233 pull the first magnet 210, the first magnet 210 that was located in the central part moves to a middle part between the electromagnets A 231 and C 233 and the user, accordingly, may feel the sense of direction from the central part to the middle part therebetween (by referring to (g) in FIG. 5).

Therefore, in accordance with the second example embodiment of the present invention, it may be adjusted to cause a magnetic field from first electromagnets 231, 232, and 233 or from second electromagnets 241, 242, and 243 to be evoked with a proper direction and a proper strength and thus the first magnet 210 or the second magnet 220 are allowed to be moved to a specific direction to deliver the sense of direction to an arbitrary direction to the user over 360 degrees.

In accordance with the second example embodiment of the present invention, the apparatus 200 for generating tactile sensation may include all or either of the first group, i.e., the first electromagnets 231, 232, and 233 and the second group, i.e., the second electromagnets 241, 242, and 243. If the apparatus 200 for generating tactile sensation in accordance with the second example embodiment of the present invention includes only the first group, i.e., the first electromagnets 231, 232, and 233, the second magnet 220 directly contacting to the target 250 without any electromagnet could deliver the sense of direction to the user by sloping to a particular direction corresponding to that to which the first magnet 210 moves (instead of moving to the particular direction).

In the aforementioned example embodiments, it is explained that the apparatus 200 for generating tactile sensation includes three first electromagnets 231, 232, and 233 or three second electromagnets 241, 242, and 243, but the apparatus 200 for generating tactile sensation in accordance with the present invention is not limited only to this. The apparatus 200 for generating tactile sensation may include only two first electromagnets placed side by side at a 180 degree angle or two second electromagnets also placed side by side at the same degree and accordingly it could be configured to provide a sense of direction to a front-back direction or create such sense to a left-right direction.

FIG. 6 exemplarily illustrates the result of an experiment by using the apparatus for generating tactile sensation in accordance with the present invention. For reference, (a) in FIG. 6 shows a graph on which applied voltage to evoke a magnetic field from the electromagnet of the apparatus for generating tactile sensation is measured through an oscilloscope and (b) in FIG. 6 illustrates a graph on which force is measured at the target by using a Piezo vibration sensor, when the target wears the apparatus for generating tactile sensation.

By referring to FIG. 6, it could be confirmed that as the target is pressed by a force, i.e., a force pressed by the magnet at sections A and B which are the time sections when the magnetic field from the electromagnet of the apparatus for generating tactile sensation arises, a prescribed sense of pressure is evolved.

As seen above, the present invention has been explained by specific matters such as detailed components, limited embodiments and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention Because a magnet itself that generates a magnetic field without any complicated mechanical components may perform a function as an actuator that generates tactile sensation, the apparatus for generating tactile sensation in accordance with the present invention may become simple, light and compact.

In accordance with the present invention, the user can feel a variety of senses of tactile sensation, including a sense of pressure, vibration, direction, etc., because the user can control the situations under which the target as an object of generating tactile sensation stimulated by the magnet may be controlled in various ways.

What is claimed is:

1. An apparatus for generating tactile sensation by using a magnetic field, comprising:
    a first permanent magnet and a second permanent magnet which are placed across a target as a subject to provide tactile sensation, said first and second permanent magnets creating a magnetic field therebetween across the target; and
    a first electromagnet placed between the target and the first permanent magnet within the magnetic field;
    wherein the magnetic field between the first and the second permanent magnets is allowed to be adjusted by adjusting at least either of a direction and a strength of a second magnetic field arising from the first electromagnet to control the strength of the force with which the target is pressed by the first and the second permanent magnets.

2. An apparatus for generating tactile sensation by using a magnetic field, comprising:
    a first permanent magnet and a second permanent magnet which are placed across a target as a subject to provide tactile sensation, said first and second permanent magnets creating a magnetic field therebetween across the target; and
    a first electromagnet placed between the target and the first permanent magnet within the magnetic field;
    wherein the magnetic field between the first and the second magnets is allowed to be changed by adjusting at least either of applying time and applying cycle of a second magnetic field arising from the first electromagnet to control vibration, caused by the first and the second permanent magnets, delivered to the target.

3. An apparatus for generating tactile sensation by using a magnetic field, comprising:
    a first permanent magnet and a second permanent magnet which are placed across a target as a subject to provide tactile sensation, said first and second permanent magnets creating a magnetic field therebetween across the target;
a first electromagnet placed between the target and the first permanent magnet within the magnetic field; and
a second electromagnet placed between the target and the second permanent magnet within the magnetic field;
wherein the magnetic field between the first and the second permanent magnets is allowed to be adjusted by adjusting at least either of a direction and a strength of a second magnetic field arising from the first electromagnet to control the strength of the force with which the target is pressed by the first and the second permanent magnets; and
wherein the strength of the magnetic field between the first and the second permanent magnets is allowed to be changed by changing at least either of applying time and applying cycle of a third magnetic field arising from the second electromagnet to control vibration, caused by the first and the second permanent magnets, delivered to the target.

4. The apparatus of claim 3, wherein the second magnetic field arising from the first electromagnet and the third magnetic field from the second electromagnet are independently adjusted.

5. An apparatus for generating tactile sensation by using a magnetic field, comprising:
a first permanent magnet and a second permanent magnet which are placed across a target as a subject to provide tactile sensation, said first and second permanent magnets creating a magnetic field therebetween across the target; and
at least two first electromagnets placed between the target and the first permanent magnet, at even distance therebetween with a preset angle;
wherein the first permanent magnet is moved on the first electromagnets by adjusting at least one of a strength, a direction, applying time, and applying cycle of a second magnetic field arising from at least one of said first electromagnets to control the change of the location where the target is pressed by the first and the second permanent magnets.

6. The apparatus of claim 5, wherein the first electromagnets include three first electromagnets placed between the target and the first permanent magnet, at even distance therebetween in a form of regular triangle.

7. The apparatus of claim 5, wherein the second permanent magnet slants according to the location of the first permanent magnet.

8. The apparatus of claim 5, further comprising: at least two second electromagnets placed between the target and the second permanent magnet, at even distance therebetween with a preset angle; and
wherein the second permanent magnet is moved on the second electromagnets by adjusting at least one of a strength, a direction, applying time, and applying cycle of a third magnetic field arising from at least one of said second electromagnets to control the change of the location where the target is pressed by the first and the second permanent magnets.

* * * * *